N. G. THOM.
Making Wood Screws.
No. 25,150.
Patented Aug. 16, 1859.
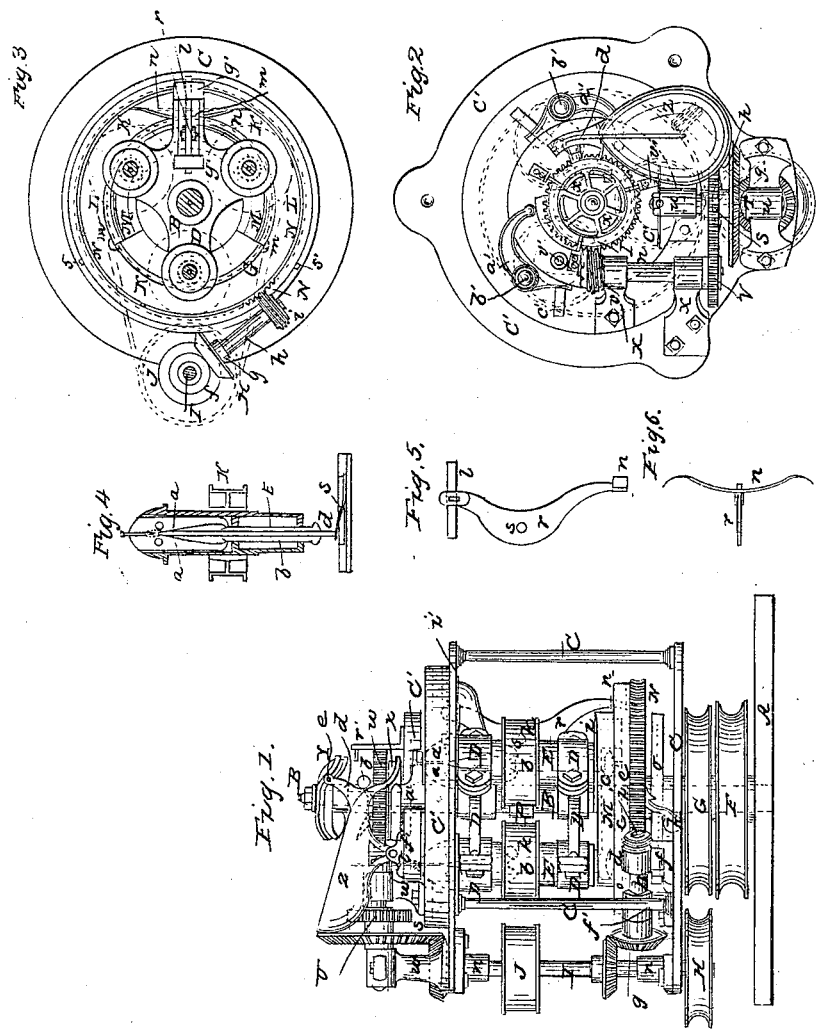

UNITED STATES PATENT OFFICE.

N. G. THOM, OF CINCINNATI, OHIO.

IMPROVED MACHINE FOR NICKING AND TRIMMING HEADS OF SCREWS.

Specification forming part of Letters Patent No. 25,150, dated August 16, 1859.

*To all whom it may concern:*

Be it known that I, N. G. THOM, of Cincinnati, county of Hamilton, and State of Ohio, have invented a new and useful Machine for Shaving, Nicking, and Trimming the Heads of Screw-Blanks; and I do hereby declare that the following is a full and exact description of the construction and operation of the same, reference being had to the annexed drawings, making a part of this specification, in which—

Figure 1 is an elevation; Fig. 2, a plan; Fig. 3, a plan of the worm-gear and annular cam-yoke in which the spindles revolve, catch for holding the head in position, &c. Fig. 4 is one of the spindles or blank-holders in section, and spring and rod for discharging the screw. Fig. 5 is a side view, and Fig. 6 a top view, of the brake-lever and spring.

The same letters refer to the same parts in all the drawings, and figures, when inclosed in parentheses, refer to the different drawings in the following description.

A, Fig. 1, is the bed-piece, into which the upright spindle B is fixed (1, 2, and 3) and on which the machine revolves.

C C' C'', with the attachments, constitute the revolving head, which revolves on the shaft B with an interrupted or intermittent motion, carrying with it and upon it the necessary tools for shaving, nicking, and trimming the heads of screw-blanks.

D D, Figs. 1 and 3, are the yokes, in the bearings of which the spindles E (4) revolve, and which are made fast to the stationary spindle B, the upper yoke having upon it the stand $g'$, Fig. 3, in which the sliding catch $l$ (3 and 5) works.

E E, Figs. 1 and 4, are the spindles or blank-holders having attached to them the grippers $a$ $a$ (4) and cone $b$ for operating them, and rod $d$ for discharging the blank. The head on the lower end of the cone-rod $b$ is operated upon by the annular cam M to open and shut the grippers.

F is a pulley running loose upon the stationary shaft B, which receives motion from the motive power, and has the pulley G made fast to it.

H is a pulley on the upright shaft I, which receives motion from the pulley G and communicates it to the spindles by the pulley J on the upright and pulleys K on the spindles.

M (1 and 3) is an annular cam attached to the worm-wheel N, having a wedge-shaped rise at $i'$ (1) to raise the spindle containing the blank up to the nicking-saw, and also internal projections at $c$ $c''$ (shown by dotted lines in Fig. 1) to open and close the grippers by operating on the head of the cone-rod $b$ in the spindles.

N (1 and 3) is a worm-gear driven by the upright shaft I by the gears $f$ and $g$ and worm $i$ on the shaft $h$, supported by the stands $f'$, and which gives motion to the cam M and revolving head C C' C'' alternately.

O is a plate made fast to the upright spindle B, in which the pawl $k$ works, to arrest the motion of the gear N when the head revolves.

P (1) is a stand on the upright shaft B, on which the spring-lever $r$ (1 and 5) works.

R is a gear on the upright shaft I, which drives the gear $s$ on the saw-shaft T.

U is a gear on the saw-shaft, which drives the gear V on the worm-shaft W, supported in the stands X X and having the worm $v$ (1 and 2) fixed upon it to drive the worm-wheel $w$, tool-cam $x$, and hopper-cam Y, and is connected to them by the pawl $z$, working in notches in the tool-cam.

L is the hopper on the stand $f'$, attached to the plate C'.

$e'$ is a pin in the arm $d'$ of the hopper, which works in the groove in the rim of the cam Y.

$u$ $u$ are stands to support the saw-shaft T.

$t$ is the saw for cutting the nicks in the heads of the blanks.

$a'$ $a'$ are the tool-stocks which carry the tools $c'$ $c'$ for finishing the heads of the blanks.

$b'$ $b'$ are studs on which the tool-stocks work.

$o$ (1 and 3) is a ring on the gear N, against which the spring $n$ is pressed when the catch on the lever $r$ is withdrawn from the notches $s'$ $s'$ $s'$ in the plate C', Fig. 3, by the projections $m$ $m$ $m$ on the annular cam M.

$e$ (1 and 4) is a spring attached to the bottom of the cam M and traveling with it, which operates upon the rod $d$ (1 and 4) to discharge the blank from the jaws.

$s$ (1 and 5) is a pin in the stand P, on which the lever $r$ works.

Having fully described the different parts and their uses, I now proceed to describe the operation of the machine. Motion being given to the pulleys F and G, it is communicated to the upright shaft I by a belt passing around the pulleys G and H on the upright, on which is the pulley J, which communicates motion to the spindles by a belt around the pulley J and pulleys K K on the spindles. The worm-wheel N is driven by the gear $f$ on the upright and $g$ on the worm-shaft and the worm $i$, working in the gear, carrying with it the cam M. The worm-wheel $w$ is driven by the wheel R on the shaft I, and S on the worm-shaft W and worm $v$, working in the wheel and carrying with it the hopper-cam Y and tool-cam $x$ by the pawl $z$. The machine now being in motion, the hopper L is filled with blanks, which slide down the incline of the hopper, while the cam Y being in motion the end of the hopper is depressed by the pin $e'$ in the arm $d'$ on the hopper working in the inclined groove in the cam Y, and the grippers $a\ a$ in the spindle being open the blank is deposited in the jaws, while the projection $c$ (shown by dotted lines, Fig. 1) on the cam M, coming in contact with the head of the cone-rod $b$, (4,) forces the cone up between the end of the grippers and fastens the blank, as shown in Fig. 4, while the spindle is revolving. The projection $m$ on the cam M having arrived opposite the end of the lever $r$, depresses the spring $n$ on the lever, as shown by dotted lines at $m\ l$, Fig. 3, and withdraws the catch $l$ from the notch $s$ in the plate C'. At the same time the spring $n$, being pressed against the rim $o$ on the wheel N, arrests its motion and allows the head to revolve one-third way round till the catch $l$ enters another notch in the plate C' bringing the shaving-tool $a'$ around to the blank which has been deposited in the spindle, as described. During the moving of the head the pawl $z$ is disengaged by coming in contact with the knee $v'$, disengaging it from the tool-cam $x$ and hopper-cam Y, allowing them to remain stationary all or most of the time the head C C' C'' is making its third revolution, and by moving the hopper around the cam Y raises it to its original position. The head having now been arrested by the catch $l$ in the notch $s$ and the pawl $z$ fallen into the notch in the tool-cam, carries it round with the worm-wheel, working up the tool $c'$ in the tool-stock $a'$ to the head of the blank, which, being in motion, is cut into the required form. Meanwhile another blank has been deposited in another spindle by the hopper, as before described. The head now makes another third revolution, bringing the saw to the blank which has just been shaved and the shaving-tool $a'$ to the blank just deposited. The projecting incline $i'$ on the upper surface of the annular cam M, Fig. 1, coming in contact with the bottom of the spindle D', (which is now relieved from the belt and standing still,) forces it upward, carrying the head of the blank in the spindle against the saw until the nick in the head is cut to a proper depth. The head now makes another third revolution, bringing the trimming-tool $a''$ to the blank just nicked, while the saw is brought to the blank which has been shaved while another was nicked, and a third is operated upon by the shaving-tool. The trimming-tool is now worked up to the head of the blank by the tool-cam $z$, to take off the burr left by the saw, and falls back, while the internal projection $c''$ on the cam M (shown by dotted lines, Fig. 1) comes in contact with the head of the cone-rod $b$ and withdraws it, thereby releasing the blank which has just been finished. The spring $e$ being brought under the end of the rod $d$, forces the released blank from the jaw, and the spring, continuing its circular motion, allows the rod $d$ to fall back in position to receive another blank from the hopper, thus discharging a finished blank at each successive intermittent rotary motion of the head and performing the operation of shaving, nicking, and trimming a blank between each successive rotary intermittent motion simultaneously, or nearly so.

The peculiar features of the machine consist principally in the arrangement by which the head remains stationary while the tools for performing the different operations upon the blank are doing their work, and when the head revolves to bring the different tools to each spindle successively the cams and other parts of the machine for operating the tools remain stationary; also, the arrangement of the spindles and driving-shaft so constructed that the belt acts upon the spindles containing the blanks to be shaved and trimmed, while the spindle holding the blank to be nicked is free from the action of the belt without the use of a binder or other device; also, the placing of the trimming and shaving tools and saw upon a revolving head and carrying them round the spindles which are stationary. I do not confine myself to the precise construction of the machine, but claim any construction embracing substantially the same principles.

What I claim particularly as my invention, and desire to secure by Letters Patent, is—

1. A revolving or rotating head, which revolves around a series of spindles or blank-holders with an intermittent or interrupted motion, carrying upon it the necessary apparatus and tools for shaving, nicking, and trimming or otherwise finishing the heads of screw-blanks.

2. In combination with the spindles or blank-holders, the annular cam M, having internal and external inclined surfaces for the purpose of raising the spindle in the nicking process and operating the grippers by acting upon the cone-rod $b$.

3. In combination with the spindles or blank-holders, the rod $d$ and spring $e$ or its equivalent, when such spring or equivalent is made to act upon the rod at required intervals to discharge the blank by being attached to some rotating or reciprocating portion of the machine.

4. The lever $r$, the spring $n$, and catch $l$, or other mechanical equivalent which acts upon the machine for the purpose of arresting one part while it releases another, substantially as described, and for the purposes set forth.

5. The arrangement of the spindles and driving-shaft in such manner that while the spindles containing the blanks to be shaved and trimmed are acted upon by the driving-belt the spindle containing the blank to be nicked is not acted upon, and the necessary tension is given the belt at all points in the revolution of the head without the use of a binder, substantially as described.

6. In combination with the worm-wheel $w$ or its equivalent for giving motion to the cams, the cam Y on tool-cam $x$, when acted upon in such manner that the said cams remain stationary while the head revolves, or nearly so, and the cams revolve while the head is stationary, substantially for the purposes set forth.

7. Finishing the heads of screw-blanks by an apparatus by which the necessary tools for finishing the head are revolved round the spindles or blank-holders, whether such blank-holders are stationary or otherwise.

N. G. THOM.

Witnesses:
W. K. NIXON,
T. B. PADDACK.